E. G. KESLING.
PRINT TITLING ATTACHMENT FOR FILM CAMERAS AND METHOD OF PRODUCING TITLED NEGATIVES.
APPLICATION FILED DEC. 6, 1916.

1,270,956.

Patented July 2, 1918.
3 SHEETS—SHEET 1.

WITNESSES
Howard D. Orr.
F. T. Chapman.

Elmer G. Kesling,
INVENTOR,
BY E. G. Siggers
ATTORNEY

E. G. KESLING.
PRINT TITLING ATTACHMENT FOR FILM CAMERAS AND METHOD OF PRODUCING TITLED NEGATIVES.
APPLICATION FILED DEC. 6, 1916.

1,270,956.

Patented July 2, 1918.
3 SHEETS—SHEET 3.

WITNESSES
Howard D. Orr
F. T. Chapman

INVENTOR,
Elmer G. Kesling,
BY
E. G. Siggers
ATTORNEY

UNITED STATES PATENT OFFICE.

ELMER G. KESLING, OF BLOOMFIELD, MISSOURI.

PRINT-TITLING ATTACHMENT FOR FILM-CAMERAS AND METHOD OF PRODUCING TITLED NEGATIVES.

1,270,956.     Specification of Letters Patent.     Patented July 2, 1918.

Application filed December 6, 1916. Serial No. 135,452.

*To all whom it may concern:*

Be it known that I, ELMER G. KESLING, a citizen of the United States, residing at Bloomfield, in the county of Stoddard and State of Missouri, have invented a new and useful Print-Titling Attachment for Film-Cameras and Method of Producing Titled Negatives, of which the following is a specification.

This invention has reference to print titling attachments for cameras, especially cameras of the roll film type, and its object is to produce directly upon the film while in the camera and by the aid of light, a negative of a written title or other distinctive marking upon a restricted area closely associated with that portion of the film acted upon by the light image produced by the lens, so that the positive print of a negative made by the camera has thereon a positive reproduction of the written title or other markings.

In accordance with the invention the camera, which may be of a special or a commercial type adapted for the use of a roll film, has a back provided with a plate of opaque material and an opening through the back so located that a circumscribed portion of the sensitive surface of the film may be exposed to the action of actinic light reaching the film through the opening. The plate is so arranged that it may be moved within the camera across the opening to shield the sensitive film from the action of actinic light passing through the opening, and at the same time serve as a writing table to support a backing sheet supplied with the carrier for the sensitized emulsion of the film.

Provision is made for direct access to the backing sheet of the roll film, while within the camera, for the production on the backing sheet of an inscription. A writing implement, such as a pen or pencil, capable of depositing light retarding material upon the backing sheet, may be used, so that the inscription is in light-retarding material taken from the writing implement while the backing sheet is formed of light-transmitting material with the light of actinic value. Such backing sheet may be conveniently made of white or similar paper readily permeable by actinic light.

The invention contemplates the employment, in connection with the light-transmitting opening through the backing, of light dimming means, whereby the actinic value of the light exterior to the camera is reduced so that its effect upon the sensitive film within the titling area is so diminished that there is no liability of over exposure. Such dimming of the light may be accomplished either by exposing the entitled area for a minute fractional period of time to actinic light, or by providing a window of a character to greatly diminish or dim the actinic value of the light.

By the invention the sensitive surface of the film where the title is to be produced is wholly protected from the effects of actinic light during the application of the title, and then the entitled area is exposed to the action of actinic light suitably dimmed or reduced in actinic value to light print the title upon the sensitized emulsion.

A roll film particularly adapted for the purposes of this invention is shown, described and claimed in application Serial No. 64537, filed by me on December 1, 1915, for a print titling roll film, in which the film consists of a celluloid carrier with a sensitized emulsion on one surface and is provided with a backing capable of transmitting actinic light, such backing being usually of white paper of a character suitable for receiving pencil marks or marks from other writing implements.

In another application for a print titling attachment for roll film cameras, Serial No. 64,536, filed by me on December 1, 1915, there is shown means for accomplishing the same purpose as this invention, such means including light dimming means, whereby liability of over exposure in light printing the title on the sensitized film is avoided.

This last-named feature, that of dimming the actinic value of the light, is made the subject-matter of certain of the appended claims, and certain of such claims are designed to express the invention in broad enough terms to comprehend those features of the said application No. 64,536, which are common to both the said application and this application.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

Referring to the drawings and more particularly to Figs. 1, 2, 3, 8 and 9, there is shown a camera body 1 which may be taken as indicative of a known form of roll film camera and hence requiring no particular description. The particular camera illustrated is provided with a removable back 2 which in the main is of known construction, and hence requires no particular description. The camera body 1 has suitable chambers 3, 4 at the ends for spools 5, 6 of the kind usually provided for roll films. In the particular arrangement shown in the drawings the spool 5 constitutes the winding spool and the spool 6 constitutes the initial carrying spool for a roll film indicated generally in Fig. 3 at 7 as partially wound upon the winding spool 5. The film 7 may be considered as a roll film constructed in accordance with the roll film shown and described in my aforesaid application, Serial No. 64,537. So far as this invention is concerned the roll film 7 need be considered only in so far as it comprises a sensitized carrier 8 in the form of a long band of celluloid or the like with a film on one face consisting of a sensitized emulsion, and, in conjunction with the carrier 8, a backing strip 9, which, when the film is properly located within the camera, is on that side of the carrier 8 toward the back of the camera. The backing 9 is customarily formed of white paper, although other substances may be used instead of white paper so long as they are capable of readily transmitting actinic light and of receiving material from a writing implement, such as a pen or lead pencil. While other writing implements might be employed, a pen or a lead pencil constitutes the most convenient form of writing implement for the purpose and has the advantage of being universally carried.

The camera body is shown as provided with the customary bellows 10 and a frame 11 to which one end of the bellows is attached, and which frame defines the usual image area at which the sensitized emulsion of the film is exposed to the light image produced by the lens of the camera, such lens being indicated at 12.

At a suitable point between the view opening in the frame 11 and the chamber 3 in the body of the camera, there is pivoted a plate 13, which in the particular showing of the drawings is of generally rectangular outline and longer in one direction than in the other. The plate 13 is long enough to extend from one side to the other of the frame 11 crosswise of the camera and is mounted near one corner upon a shaft 14 extending through and journaled in one side member of the body 1. The shaft is made long enough to reach to the front of the body of the camera and is there bent into or provided with a handle member 15, which in the particular showing of the drawings extends at about right angles to the shaft 14. The free end of the handle 15 is suitably formed, as with a boss 16, to engage in a notch or recess 16ª in the front of the side member of the camera to hold the plate 13 in a position where it is transverse of the image opening in the frame 11, such opening being customarily longer than wide. When the plate 13 is thus temporarily locked in position it overlies a portion of the frame 11 in which the corresponding end of the bellows 10 is secured and one long edge of the plate then projects toward the chamber 3 and may enter it for a short distance. The other long edge of the plate 13 then encroaches for a short distance upon the image space within the frame 11.

The back 2 at a point about opposite that part of the frame 10 adjacent to the chamber 3 and housing the corresponding part of the bellows 10 is provided with an opening or passage 17 of such length and width as to permit the passage of the writing end of a writing implement and give room for the manipulation of the writing implement to inscribe a legend upon the paper backing 9 of the roll film.

Surrounding the opening 17 is a plate 18 with an opening 19 therethrough surrounding the opening 17 and of somewhat larger area. The plate 18 is provided about the opening 19 with a raised margin or flange 20. Secured to the plate 18 is a hinge 21 having one leaf 22 fast to the back 2 and another plate 23 formed into a frame 24 of generally channel shape and of a size so that the channel will receive the marginal flange 20 of the plate 18. The channel frame 24 has felt or other suitable material indicated at 25 lodged therein so as to engage the flange 20 and therefore provide a light-tight joint between the channel frame 24 and the marginal flange 20 when the frame 24 is closed against the plate 18. The hinge leaf 22 is formed with a spring 26 engaging the hinge 21 and arranged in a customary manner to hold the frame 24 in either the open or the closed position with sufficient force to prevent accidental movement of the frame, especially to the open position. The frame 24 in the side remote from the hinge 21 is provided with a lip or a prolongation 27 resting on a continuation of the plate 18 beyond the opening 19 on the side thereof remote from the hinge 21. There is also provided a cover 28 of a size to inclose the frame 24, this cover being connected to the prolongation 27 by a hinge 29 and at the other end adjacent to the hinge 21 formed with a finger-receiving notch 30, whereby the cover may be readily moved to the open position when desired. The hinge 29 is provided with a spring 31 tending normally to maintain the cover in the closed position. The channel frame 24 has its inner wall or web 32 defining a passage 33 of a size about the same as the passage 17. Lodged in and filling the passage 33 is a window pane 34 of a character permeable to actinic light, but greatly reducing the actinic value of the light, wherefore light passing through the window 34 from the exterior of the camera to the interior thereof is of slow printing quality with reference to the sensitiveness of the sensitized film on the carrier 8 of the roll film. A glass, known as commercial smoked glass, has been found in practice to answer the purposes of the window pane 34.

In order to avoid leakage of light into the camera beyond the area defined by the opening 17, the inner wall of the back 2 is provided with a felt or other covering 35 pressed inwardly away from the inner wall of the back 2 by springs 36. The felt bears against the paper backing of the roll film and forces it against the plate 13 when interposed between the carrier 8 and the paper backing 9, and as the plate 13 is of actinically opaque material, such as metal, light entering through the opening 17 cannot reach the sensitive surface of the film except within an area substantially that defined by the felt border 35.

Considering the camera as properly loaded with a roll film of the character stated, and assuming that it is desired to inscribe a title upon the backing descriptive of the scene of which an exposure has been or is to be produced upon the film located within the view opening of the frame 11, the plate 13, which, if it be assumed was not so located at the time of the exposure of the film of the lens image, is moved by a suitable manipulation of the handle 15 so as to interpose between the backing sheet 9 and the carrier 8 on the camera side of the opening 17, thus thoroughly shielding the film on the carrier 8 from access of actinic light adjacent to the opening 17. Since the frame 24 and the door or cover 28 are normally closed, no light can under such circumstances enter the camera through the opening 17. However, with the plate 13 properly positioned to protect the sensitive film, the frame 24 and with it the door or cover 28, may be moved about the hinge 21 to freely expose the opening 17 to access, and this freely exposes the portion of the backing 9 opposite the opening 17 to view and access. Now, a suitable inscription is placed upon the visible portion of the backing 9, such inscription being most conveniently produced by an ordinary lead pencil in the ordinary act of writing or printing with a lead pencil. Of course, a pen may be used for the same purpose, but ordinarily a lead pencil is the more convenient implement. Following this act of inscribing the title or description, the hinged members 24 and 28 are moved to the closed position, thus effectively cutting off access of light to the interior of the camera through the opening 17. The next step in the procedure is to manipulate the handle 15 in a manner to move the plate 13 from interposing relation between the opening 17 and the sensitized film. Then the door 28 is opened and permitted to remain open for an appreciable time with the pane or plate 34 exposed to actinic light. Such light finds access to the sensitized film in the inscribed area, but the light is greatly subdued because of the character of the pane or plate 34, wherefore the printing proceeds slowly and yet with such speed that an exposure of a very few seconds is sufficient to affect the sensitized film where unprotected by the inscription to the desired extent. The time necessary is, however, sufficiently prolonged by the modifying or retarding action of the pane 34 to permit considerable latitude in exposure without danger of over exposure.

This is an important feature because of the extreme senstiveness of photographic films of the roll film type, for otherwise it is highly difficult to properly expose the film where inscribed and by the act of opening and closing a door. In the great majority of cases an over exposure is the result and the inscribed area of the negative has a materially different printing value from the portion of the negative light affected through the lens.

With the present invention the great latitude permitted by the dimming of the actinic value of the light due to the presence of the plate 34 permits the light printing of the title to a degree so closely approaching that produced by the light passing through the lens that there is no need of dodging in producing positive prints from a finished negative. When the operator is ready to expose another section of the film to the lens image, the plate 13 may be restored to its normal interposing relation between the carrier 8 and backing 9 and across the opening 17 and the roll film may be fed in the camera in the usual manner. The plate 13 may be left in its normal or interposing position except when it is desirable to light print an inscribed title on the film. In order to insure the replacing of the plate 13 into its normal position after being moved therefrom, the handle 15 is so located that it will project laterally from the front portion of the body of the camera and be obtrusively in the way of ordinary manipulation of the camera, wherefore the operator is constrained to always replace the plate 13 into its normal position after having finished the exposure of the film to light print the inscription. This also protects the film, for even if the door 28 or frame 24 were not in the closed position, the film would not be accidentally exposed to the effect of actinic light.

In order to facilitate the movements of the plate 13 from and back to the normal position, this plate being always contained within the body of the camera, there is provided a guide plate 37 located at the end of the camera body remote from the plate 13 and encroaching somewhat on the view opening of the frame 11. This plate is mounted upon pins or supports 38 near one edge of the plate attaching it to the frame 11 and permitting a certain play of the plate. The arrangement is such that the plate 37 always interposes between the carrier 8 and backing 9, thus holding them separated to permit the ready movement of the plate 13 between the carrier and the backing when the plate is being moved from and toward its normal position.

Figure 1:
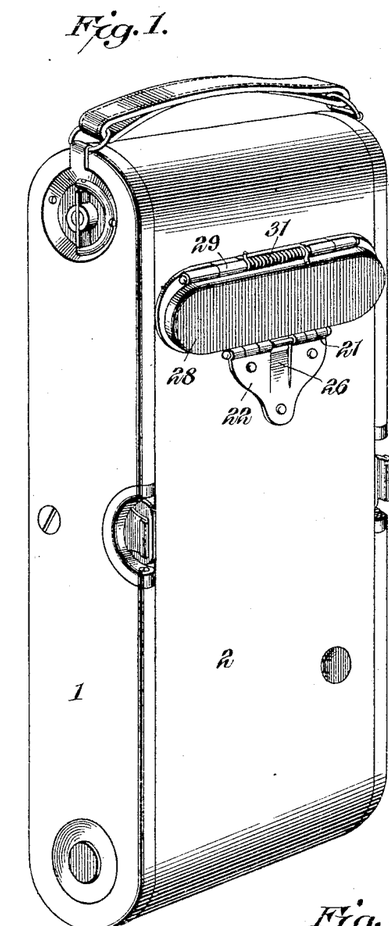
Figure 1 is a perspective view of a roll film camera embodying certain features of this invention, the view being that of the rear portion of the camera.
Figure 2:
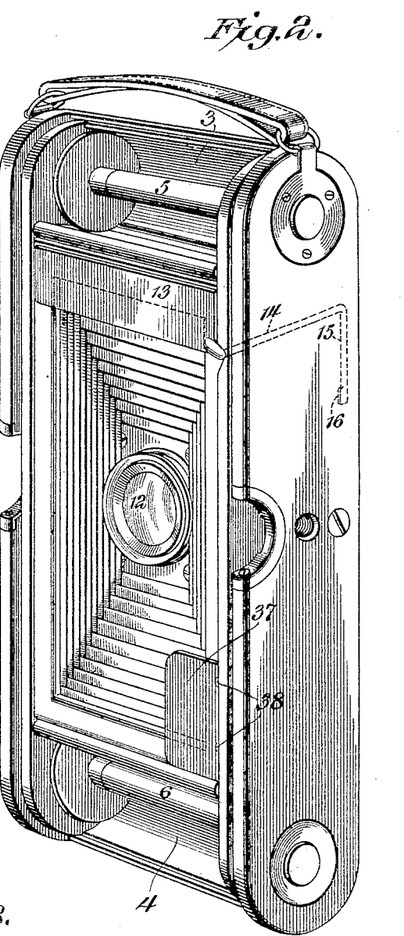
Fig. 2 is a perspective view of the camera shown in Fig. 1, but with the back of the camera removed.
Figures 3, 7, 9:
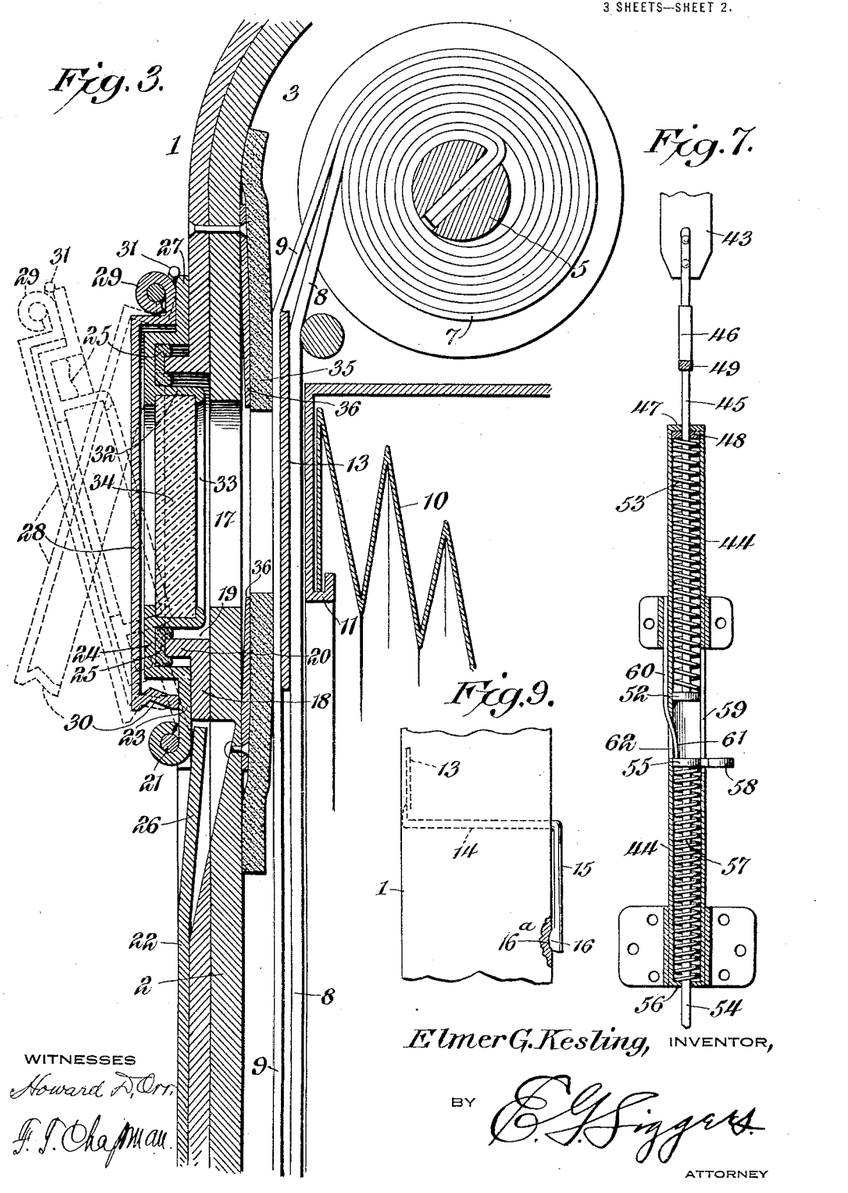
Fig. 3 is a longitudinal central section of the camera of Figs. 1 and 2, with the showing limited in most part to the neighborhood of the titling opening through the back of the camera and showing the parts on an exaggerated scale and the roll film and its backing being shown in edge elevation.
Fig. 7 is a longitudinal section at right angles to the section of Fig. 5 and limited to the shutter operating mechanism.
Fig. 9 is a detail view of a division-plate manipulating means.

In the structure shown in Figs. 1, 2, and 3 the light affecting the sensitive film in the production of a light print of the title is optically modified, so as to reduce its actinic value without the light being chromatically modified. It is practicable to obtain a similar effect mechanically by providing for the mechanical exposure of the portion of the film to be light printed by the inscription with the exposure so rapid that the actinic value of the light is correspondingly reduced and over exposure of the film thereby prevented. Such a mechanical arrangement is shown in Figs. 4, 5, 6 and 7. There is provided a camera back $2^a$ which in the main is similar to the camera back 2 of Figs. 1 and 3, except that a different structure is employed in order to provide access to the backing 9 and to cause the light printing of an applied inscription on the sensitized film. The back $2^a$ has an opening $17^a$ protected by a felt border $35^a$. The back $2^a$ may be used with the same camera body 1 as shown in Figs. 1 and 2, and the plate 13 is employed with the arangement of Figs. 4, 5, 6 and 7 the same as it is employed in connection with the structure of Figs. 1 and 3. Moreover, the plate 37 is employed in connection with the structure of Fig. 4 and associated figures. For this reason no showing of the camera body, illustrated separately in Fig. 2, is made in conjunction with the showing of Fig. 4 and associated figures. Applied to the rear face of the back $2^a$ is a plate 39 with a passage 40 therethrough corresponding to the passage $17^a$ and so situated that the passage $17^a$ may be exposed through the passage 40 and the backing sheet 9 may be also exposed through the passage 40. The plate 39 defines a chamber 41 between it and the rear face of the back $2^a$. Mounted in this chamber 41 is a shutter plate 42 of such size that in one position it completely closes the opening $17^a$ and in another position completely exposes the opening or passage $17^a$. The shutter plate 42 is in the form of an elongated rectangle in the particular showing of Fig. 4, and midway of one long side is formed with a stem 43 of a length to project beyond one edge of the plate 39.

Fast to the rear face of the back $2^a$ in line with the stem 43 is a tubular casing 44 entered at the end toward the plate 39 by a rod 45 made fast to the stem 43. The rod 45 adjacent to the point of connection with the stem 43 is provided with a latch block 46 to which reference will hereinafter be made. The casing 44, at the end from which the stem 45 issues, has a head 47 carrying a bracket 48 terminating at the end remote from the head 47 in a nose 49 which may be moved into the path of either end of the block 46. The bracket 48 is more or less elastic and has fast thereto a manipulating member or handle 50 under the control of a spring 51 made fast to the casing 44. The action of the spring 51 is to urge the nose 49 into the path of one end or the other of the block 46, but the elasticity of the bracket 48 is sufficient to permit movement of the nose 49 out of the path of the block 46.

The stem 45 passes freely through the head 47 and terminates within the casing 44 in a head 52 at a sufficient distance from the end of the casing from which the stem 45 issues to accommodate a coiled spring 53 surrounding the stem 45 within the casing and abutting the heads 47 and 52. The tendency of the spring 53 is to move the stem 45 into the casing and at the same time move the shutter plate 42 toward the casing 44 to an extent to uncover the passage 40.

Within the casing and extending longitudinally thereof is another stem 54 terminating at one end within the casing in a head 55 and at the other end projecting through a head 56 on that end of the casing remote from the head 47. The stem or rod 54 is surrounded within the casing by a coiled spring 57 abutting the heads 55 and 56. The head 55 has a fingerhold 58 projecting from one side thereof and through a longitudinal slot 59 in the casing 44, thus permitting a movement of the stem 54 lengthwise of the casing.

Fast to the casing 44 is a latch tongue 60 having a free end 61 projecting through a slot 62 in the side of the casing, and having a normal tendency to move into the path of the head 55.

Figures 4, 5, 6:
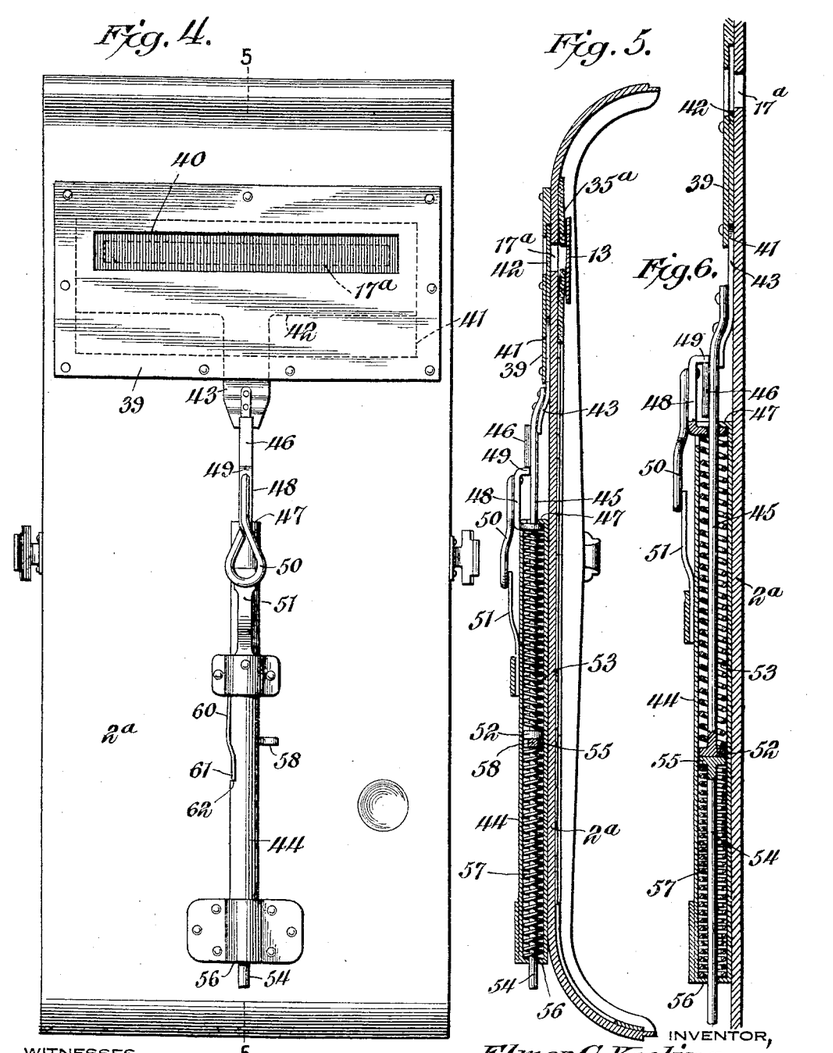
Fig. 4 is a rear face view of the back of a camera of the same type as shown in Figs. 1 and 2, but illustrating a different mechanism for permitting access to the backing of the roll film and for light printing the title applied thereon.
Fig. 5 is a section on the line 5—5 of Fig. 4.
Fig. 6 is a view similar to Fig. 5 but drawn on a larger scale and showing the parts in position permitting access to the backing of the roll film for the application of the title thereto.
Figure 8:
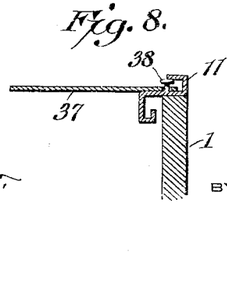
Fig. 8 is a detail section of a plate lodged within the camera and attached to the body thereof for interposition between the sensitized film carrier and the backing sheet therefor.

In the normal condition of the movable parts of the structure of Fig. 4 and associated figures, both springs 53 and 57 are under compressive tension, but the spring 57 is stronger than the spring 53. When the various parts of the structure of Fig. 4 and associated figures are not being employed for titling purposes, the shutter plate 42 is in closing relation to the opening 40. The finger or manipulating member 58 is at an intermediate portion of the slot 59 with the heads 52 and 55 in engagement and the nose 49 engaged by that end of the block 46 remote from the shutter plate. This position of the parts is shown in Figs. 4 and 5. If, now, it be desired to expose the paper backing 9 for the application of an inscription, pressure is applied to the manipulating member 50 so as to move the nose 49 out of the path of the block 46. The manipulating finger pieces 58 is moved in a direction to compress the spring 57 and move the head 55 away from the head 52. This releases the spring 53 to action, whereupon the spring acting on the head 52 causes a longitudinal movement of the stem 45 into the casing 44, thus drawing the shutter plate 42 with it until the block 46 has underridden the nose 49 sufficiently to permit the nose to snap into the path of the block 46 at the end thereof toward the shutter 42, which latter thereupon becomes locked in the open position. Now, an inscription may be applied to the backing 9, thus exposed, it being understood that the plate 13 is in interposing relation between the backing 9 and the sensitized film where opposite the opening or passage 17$^a$. Having applied the inscription, the operator then presses upon the manipulating member 50 to move the nose out of the path of the block 46, whereupon the shutter being released to the action of the spring 53 quickly moves to the closed position, being urged to this position by the spring 57 overpowering the spring 53. The movement of the shutter in closing is sufficient to carry the block 46 beyond the nose 49, so that the nose 49 becomes a stop for the block 46 preventing movement of the shutter to the open position. The operator now moves the finger piece 58 in a direction away from the opening 40, thus compressing the spring 57 and moving the stem 54 until the latch tongue 61 snaps into the path of the head 55, thus locking it in the retracted position. The shutter 42 remains in the closed position because there held by the nose 49 engaging that end of the block 46 remote from the shutter. This leaves the spring 53 under considerable tension amply sufficient to open the shutter. Now, the operator by pressing the manipulating member 50 in opposition to the spring 51 moves the nose 49 out of the path of the block 46, whereupon the expansion of the spring 53 immediately moves the shutter to the open position bringing the head 52 into engagement with the end 61 of the tongue 60 then in the path of the head 55. This causes a movement of the tongue end 61 out of the path of the head 55, whereupon the expansion of the spring 54 with a force superior to that of the spring 53 immediately overcomes the spring 53 and forces the shutter again to the closed position, where it is caught by the nose 49 engaging behind the block 46. These movements of the shutter to the open and closed position are extremely rapid, so that the effective actinic value of the light reaching the sensitized film in the inscribed area through the backing 9 is so weak that the exposure of the sensitized film in the inscribed area closely corresponds to the exposure of the other parts of the film to the lens image, and consequently when the exposed film is developed the printing value of the titling area is approximately that of the image produced by the lens.

The speed of the shutter 42 may be about that usually employed in so-called "snap shots", which speed is quite appropriate for high lights, especially such as are in effect transmitted through the white paper backing 9.

The contrast between the pencil mark upon the white paper backing 9 and the light-transmitting qualities of such white paper is so marked that the actinic effect of the light transmitted through the white paper to the sensitive emulsion is sufficient to affect the emulsion to an extent corresponding to the high lights of the light image produced by the lens, while the portions of the emulsion protected by the pencil marks are substantially unaffected, wherefore the resultant negative will, when used for printing, produce the title in dark strokes upon a practically clear background, with the printing effect about the same as the negative produced by the lens image.

In the arrangement shown in Fig. 1 and associated figures the same degree of contrast occurs between the pencil inscription and the white paper backing 9, so that a contrasty effect is obtained with respect to the inscription and the immediate surrounding area in the negative and the subsequent print, even though the actinic effect of the light be markedly retarded with respect to such light as reaches the backing 9 and is transmitted through it when the sensitive emulsion or the film is subjected to actinic light for light printing the title on the film.

In both embodiments of the invention illustrated in the drawings the actinic value of the light used for light printing the title is greatly dimmed or reduced, either by shortening the exposure to a very small fraction of a second, or reducing the force of the light and correspondingly prolonging the exposure.

The means for reducing the force of the light has been described as a plate of commercial smoked glass, but it will be understood that other means may be employed, such as properly treated celluloid or any light-transmitting medium dimming the light, so that its actinic value is low and a considerable time is necessary to produce the desired effect upon the sensitive emulsion.

It has heretofore been proposed to utilize a red paper backing for the film, upon which backing an inscription might be written for the subsequent light printing of the inscription upon the film. Experience has shown, however, that such paper produces a mottled effect upon the film because the dye or other coloring matter used in the paper does not stain it evenly, and the mottled background produced by the light transmitted through the paper interferes to such an extent with the inscription that the latter is nearly or quite obliterated. Ordinarily, the inscription is produced by a lead pencil as the most convenient writing implement, and the image from such marks is often quite completely obliterated or rendered unreadable by the mottling of the background due to the uneven staining of the colored paper. Such mottling or grain effect does not appear when white paper is used, since the light transmitting qualities of white paper are so nearly the same at all points that there is no material contrast between the thicker and thinner portions of the paper. When, however, such paper is stained, the contrast between the thicker and thinner portions becomes very marked and the so-called grain of the paper is pronouncedly evident when light printed on the film. For these reasons, the use of a red or like paper as an inscription-receiving backing for the film has no practical value.

Moreover, it is of advantage to place the light dimming means in spaced relation to the inscribed surface and to have the light dimming means more or less diffusive of light.

The white paper backing to the film provides a desirable degree of contrast between the light retarding qualities of the inscription, and especially a lead pencil inscription, and the light transmitting qualities of all parts of the area immediately surrounding the inscription.

Under these circumstances, over printing is avoided either by making the exposure of the inscription to actinic light for light printing the inscription sufficiently rapid, or by so slowing the exposure without sacrifice of contrast, that the operator may open the exposure door, hold it open for an appreciable time, and then close it without any danger of disastrous over exposure. As is well known to those familiar with the photographic art, conditions permitting a slow exposure give great latitude of exposure without liability of either over or under exposure.

While the structure of Fig. 1 and associated figures permits such desirable condition of great latitude of exposure of the titled area, and is therefore a preferable embodiment of the invention, the arrangement of Figs. 4 and associated figures has proven in actual practice to be a successfully workable embodiment of the invention.

What is claimed is:—

1. A print titling film camera provided with a film having a backing strip of white paper of a character to receive the strokes of an inscription in material resistant to the passage of actinic light, means for protecting the film from the effects of actinic light while the backing is receiving the strokes of the inscription, and means for reducing the actinic value of the light while light-printing the strokes of the inscription upon the film, said reducing means being located on the side of the white paper remote from the film and in spaced relation to said white paper.

2. In a print titling film camera in which the film is provided with a backing transmissible of actinic light and of a character to receive an inscription in material resistant to the passage of actinic light and said backing being capable of transmitting the light without material grain effect upon the film, means for protecting the film against the action of actinic light while the backing is located within the camera and is receiving the inscription, and means located on that side of the backing remote from the film for reducing the actinic value of the light passing through the inscribed portion of the backing to the film in light printing the title thereon.

3. In a print titling film camera in which the film is provided with a backing transmissible of actinic light and of a character to receive an inscription in material resistant to the passage of actinic light and said backing being capable of transmitting the light without material grain effect upon the film, means for protecting the film against the action of actinic light while the backing is located within the camera and is receiving the inscription, and means located on that side of the backing remote from the film for reducing the actinic value of the light passing through the inscribed portion of the backing to the film in light printing the inscription thereon, said light reducing means being spaced away from the backing out of contact therewith.

4. A print titling film camera provided with a controllable exposure opening for direct access to the backing strip of the film to permit the application of an inscription thereon by a writing implement, and light modifying means associated with the exposure opening for admitting light of reduced actinic value to the sensitized emulsion of the film to and through the entitled backing in a circumscribed area about the applied inscription, whereby to avoid liability of over exposure of the sensitized film in the inscribed area as would occur by light modified only by the inscribed backing strip.

5. A print titling film camera having a controllable exposure opening for giving access to the backing strip of the film to apply an inscription directly to said backing strip by a writing implement, and exposure means spaced away from the backing strip on the side thereof remote from the film and including means for reducing the actinic value of the light passing therethrough to a degree preventing over exposure of the sensitive film.

6. A print titling film camera provided with a sensitive film having a backing capable of transmitting actinic light of effectively homogeneous light print character to the sensitive film and also capable of receiving an inscription in light retarding material contrasting with the printing effect of the light reaching the film through the portion of the backing surrounding the applied inscription, and light-dimming means of effectively homogeneous character for location during the light printing operation in spaced relation to the inscribed backing on the side of the backing remote from the film.

7. A print titling film camera having a controllable opening for exposing the backing sheet of a sensitized film within the camera to access to apply an inscription thereto by a writing implement, said opening having light dimming means associated therewith on the side of the backing sheet remote from the film, whereby the inscribed area of the backing sheet may be exposed to actinic light for a prolonged time to light print the inscription upon the film without over exposure of the film.

8. A print titling film camera having an opening for view of and access to the backing sheet of the film to apply an inscription to the visible surface of said backing sheet by a pencil or other writing implement, means for protecting the sensitized surface of the film from access of actinic light while the inscription is being applied to the backing sheet, and light dimming means located at the opening exterior to the backing sheet, whereby the actinic value of light reaching the backing sheet and passing through the latter to the sensitized film is reduced so that over exposure of the sensitized film at the inscription area is avoided irrespective of said backing sheet.

9. A print-titling film camera having an opening for exposing a portion of the backing sheet of the film to view and access for the application of an inscription to said backing sheet on its visible surface by means of a writing implement, means for protecting the sensitized surface of the film from access of actinic light while the inscription is being applied to the backing sheet, and a closure for the opening having a part opaque to actinic light for wholly covering the opening and another part of reduced transmissibility of actinic light and also constituting a covering for the opening when the opaque covering is removed, whereby the actinic value of the light reaching the backing sheet is reduced to a degree avoiding over exposure of the sensitized film when the inscription is being light printed thereon.

10. A print-titling film camera having an opening to the rear of the location of the film in the camera for exposing a circumscribed area of the film to view and access, means for protecting the sensitized surface of the film from the effects of actinic light while the circumscribed area of the backing sheet is thus exposed, and a cover for the opening having a member for wholly covering or exposing the opening and opaque to actinic light, and another member for covering the opening when uncovered by the first-named member, said second member constituting a light dimming member, whereby the actinic value of light passing therethrough is reduced to a degree permitting a prolonged exposure of the sensitized surface of the film through the opening without liability of over exposing the portion of the film so exposed.

11. A print-titling film camera provided with an exposure opening located to be to the rear of the backing sheet of a sensitized film located within the camera, said opening being of a size to expose a circumscribed area of the backing sheet to view and access for the application of an inscription to the visible portion of the backing sheet by a writing implement, means for protecting the sensitized surface of the film when the backing sheet thereof is exposed to view through the said opening, and a cover member for the opening having separately controllable parts, one part constituting a light excluding member for the opening and the other part being transmissible of actinic light to a reduced degree, whereby light entering the camera through said opening is so reduced in actinic value as to permit a prolonged exposure of the sensitized film through the opening without liability of over exposure of the sensitized film.

12. A print-titling film camera, having an opening for the transmission of light and exposing to view the face of the backing sheet of the film remote from the film, said opening being of a size to permit access to the backing sheet for the application of an inscription thereto by a writing implement, means for protecting the senitized surface of the film at the inscription area from access of actinic light during the application of the inscription, and a cover member for the opening having a portion of a size to cover the opening and composed of a plate of darkened material indifferently transmissible of actinic light and another part movable into covering relation to the darkened plate and at the same time to the opening and opaque to actinic light to prevent access of the latter to the interior of the camera through said opening.

13. A print-titling film camera having a backing member with a passage therethrough for exposing a circumscribed area of the backing sheet of the film to view and access for the application of an inscription to said backing sheet by a writing implement, and a door structure for the opening having hinged members in superposed order, the hinged member nearer to the opening being movable into and out of covering relation thereto and provided with a plate of darkened light transmitting material for sensibly reducing the actinic value of light passing therethrough, and the outer hinged member being of material opaque to actinic light and movable into and out of covering relation to the first-named hinged member.

14. A print-titling film camera provided with an opening at the rear of the film area of the camera to expose a circumscribed portion of the backing sheet of the film to view and access for the application of an inscription thereto by a writing implement, means for controlling the passage of light through the opening to the sensitized surface of the film for light printing the circumscribed inscription thereon, and a plate of actinically opaque material within the camera movable to interpose between the passage and the sensitized film to protect the latter from access of actinic light entering through the passage while the inscription is being applied, and to at the same time serve as a writing table, and manipulating means for the plate having a portion exposed at the exterior of the camera and movable into obtrusive position with respect to the camera when the plate is located to permit light entering through the passage to reach the sensitized surface of the film.

15. The method of producing with film cameras negatives having inscriptions for the subsequent production of inscribed prints from such negatives, consisting in providing a film with a backing transmissible of actinic light where inscriptions are to be produced, exposing the inscription-receiving portion of the backing to direct view and access with a corresponding portion of the sensitized film protected from access of actinic light, producing the inscription in material resistant of actinic light upon the backing within the area thus exposed to view, and subsequently exposing the sensitized emulsion within the inscribed area to the effect of light actinically weakened before reaching the inscribed backing to cause such weakened light to act upon the sensitized emulsion in the titled area except where the film is protected by the inscription, whereby in the developed negative the inscription appears clear upon a dark background and in a print made from the negative the print appears dark upon a light background, with the printing value of the inscribed area corresponding to the printing value of the negative produced by the camera lens.

16. The method, in the production of titled negatives with film cameras for the subsequent production of titled prints from such negatives, consisting in first inscribing the title on the face of the backing of the film remote from the sensitized film in a material resistant to the passage of light, and then exposing the sensitized surface to the action of actinic light over an area immediately surrounding the inscribed surface with the actinic value of the light so reaching the sensitized surface reduced with respect to the actinic value of the light exterior to the camera.

17. The method, in the production of titled negatives with film cameras for the subsequent production of titled prints from such negatives, consisting in first producing a suitable inscription directly upon the backing sheet of the film on the surface thereof remote from the film and while the film is in the camera and the sensitive surface of the film is protected from actinic light, and subsequently exposing that portion of the sensitized emulsion of the film coinciding with the inscribed area to the effect of actinic light having its printing value so modified before reaching the backing sheet as to avoid over exposure of the sensitized surface of the film.

In testimony that I claim the foregoing as my own, I have hereto affixed my signature in the presence of two witnesses.

ELMER G. KESLING.

Witnesses:
E. A. MOSELEY,
WILEY WALKER.

Copies of this patent may be obtained for five cents each, by addressing the "Commissioner of Patents, Washington, D. C."